United States Patent
Eisenberger et al.

(10) Patent No.: US 12,172,123 B2
(45) Date of Patent: Dec. 24, 2024

(54) ROTATING CONTINUOUS MULTI-CAPTURE SYSTEMS AND APPARATUS FOR IMPROVED DIRECT AIR CAPTURE OF CARBON DIOXIDE (DAC+)

(71) Applicant: Global Thermostat, Brighton, CO (US)

(72) Inventors: Peter Eisenberger, Princeton, NJ (US); Eric Ping, Thornton, CO (US); Miles Sakwa-Novak, Atlanta, GA (US)

(73) Assignee: Global Thermostat Operations, LLC, Brighton, CO (US)

( * ) Notice: Subject to any disclaimer, the term of this patent is extended or adjusted under 35 U.S.C. 154(b) by 358 days.

(21) Appl. No.: 17/756,259

(22) PCT Filed: Nov. 21, 2020

(86) PCT No.: PCT/US2020/061690
§ 371 (c)(1),
(2) Date: May 20, 2022

(87) PCT Pub. No.: WO2021/102385
PCT Pub. Date: May 27, 2021

(65) Prior Publication Data
US 2023/0023050 A1 Jan. 26, 2023

Related U.S. Application Data

(60) Provisional application No. 62/938,773, filed on Nov. 21, 2019, provisional application No. 62/969,202, filed on Feb. 3, 2020.

(51) Int. Cl.
*B01D 53/02* (2006.01)
*B01D 53/06* (2006.01)

(52) U.S. Cl.
CPC ............. *B01D 53/06* (2013.01); *B01D 53/02* (2013.01); *B01D 2253/20* (2013.01);
(Continued)

(58) Field of Classification Search
CPC ................................. B01D 53/02; B01D 53/06
See application file for complete search history.

(56) References Cited

U.S. PATENT DOCUMENTS

| 8,500,858 B2 | 8/2013 | Eisenberger et al. |
| 8,647,412 B2 | 2/2014 | Jsing et al. |

(Continued)

FOREIGN PATENT DOCUMENTS

| EP | 3089809 | 12/2014 |
| WO | 2015103401 | 12/2014 |

OTHER PUBLICATIONS

International Search Report and Written Opinion, International Patent Application PCT/US2020/061690, mailed Mar. 24, 2021, (13 pgs).

*Primary Examiner* — Robert A Hopkins
(74) *Attorney, Agent, or Firm* — Thomas | Horstemeyer, LLP

(57) ABSTRACT

A system and method for, removing carbon dioxide from a carbon dioxide laden gas mixture, the system comprising a group of carbon dioxide removal structures moving along a closed curve track. At one location along the track is located a desorption or regeneration box, into which each capture structure passes in order to be regenerated. The majority of the CO2 removal structures are fed ambient air, or an admixture of ambient air with a minor portion of a flue gas, and exhaust CO2-lean air. At least one selected such removal structure within each group, at a location immediately preceding its entry into the capture structure, is fed a flue gas comprising at least 4% CO2 by volume. A method for removing carbon dioxide from the atmosphere is provided utilizing a system operating in the same manner as the preceding system.

20 Claims, 10 Drawing Sheets

(52) U.S. Cl.
CPC .. *B01D 2253/25* (2013.01); *B01D 2253/3425* (2013.01); *B01D 2257/504* (2013.01); *B01D 2259/4009* (2013.01)

(56) References Cited

U.S. PATENT DOCUMENTS

| | | |
|---|---|---|
| 9,776,131 B2 | 10/2017 | Eisenberger et al. |
| 9,925,488 B2 | 3/2018 | Eisenberger et al. |
| 10,512,880 B2 * | 12/2019 | Eisenberger ........... B01J 20/327 |
| 2012/0076711 A1 | 3/2012 | Gebald et al. |
| 2012/0174781 A1 | 7/2012 | Eisenberger |
| 2014/0026751 A1 * | 1/2014 | Anand ................... B01D 53/62 |
| | | 95/139 |

\* cited by examiner

ALL AROUND SEAL BETWEEN REGEN BOX
AND FLUE GAS HOUSINGS

150

ROTATING CONTINUOUS MULTI-CAPTURE SYSTEMS AND APPARATUS FOR IMPROVED DIRECT AIR CAPTURE OF CARBON DIOXIDE (DAC+)

RELATED APPLICATIONS

This application is the 35 U.S.C. § 371 national stage of PCT application having serial number PCT/US2020/061690, filed on Nov. 21, 2020, which claims the benefit of U.S. Provisional Application Ser. No. 62/938,773, filed Nov. 21, 2019, and U.S. Provisional Application Ser. No. 62/969,202, filed Feb. 3, 2020. Each of these applications is incorporated herein by reference in their entirety.

BACKGROUND OF THE INVENTION

The present invention relates generally to systems and methods for removing greenhouse gases from the atmosphere, and in particular to novel and improved systems and methods for sequentially first capturing carbon dioxide from a stream of gas that includes ambient air, and thereafter from at least one stream of gas containing flue gas. The present invention contemplates systems wherein said sequence may include different orders of removal of carbon dioxide. This invention further contemplates said second sequential step including more than one stream of gas comprising flue gases.

The present invention provides an improvement to the system described in U.S. patent application Ser. No. 13/098,370, filed on Apr. 29, 2011 (now U.S. pat. No. 8,500,855), and U.S. Pat. No. 9,925,488. A system and process is presented that may be recognized as one that can be utilized for a broader range of use than those disclosed in earlier applications, especially when further modified. The disclosure of that co-pending application is incorporated by reference herein as if repeated in full, as modified by the new disclosure presented herein.

There is much attention currently focused on trying to achieve what to some may be three somewhat conflicting energy related objectives: 1) provide affordable energy for economic development; 2) achieve energy security; and 3) avoid the distinctive climate change caused by global warming. Assume here, arguendo, that there is no feasible way to totally avoid the use of fossil fuels during the rest of this century, if we are to have the energy needed for economic prosperity and if we are to avoid energy shortfalls that could lead to conflict.

It is mostly undisputed by respected scientists that an increase in the amount of so-called greenhouse gases like carbon dioxide (methane and water vapor are the other major greenhouse gases) will increase the average temperature of the planet.

It is also clear that the risks of climate change will be eliminated only via reductions in ongoing human contributions to carbon dioxide emissions. Removing additional $CO_2$ from the atmosphere, known either as Direct Air Capture or Direct Air Extraction (DAC), will also be necessary. With air extraction and the capability to decrease the amount of carbon dioxide in the atmosphere, one can in principle compensate for the emission of other greenhouse gases, like methane (entering the atmosphere both naturally and from human activity) that can also cause climate change.

Especially in the last decade, it has become the generally accepted belief among experts in the field that it can become economically feasible to capture carbon dioxide directly from the atmosphere, in spite of the low concentration of that compound, in order to at least slow down the increase of so-called 'greenhouse' gases in the atmosphere. It is now understood that under ambient conditions, $CO_2$ can be efficiently extracted from the air, using a suitable regenerable sorbent system and a slightly higher, but relatively low temperature stripping or regeneration process, and that such a process can be expanded to and combined with the removal of $CO_2$ from mixtures of effluent gases mixed with a major amount of ambient air, so as to not only remove the $CO_2$ from flue gas but to remove additional $CO_2$ from the atmosphere. This will achieve a net reduction in $CO_2$ in the atmosphere at lower cost and higher efficiency.

GENERAL STATEMENT OF THE INVENTION

The present invention provides further new and useful improvements to the DAC systems and methods for removing carbon dioxide from a mass of carbon dioxide laden air, at higher efficiencies and lower overall costs including lower capital expenses ("CAPEX") and lower operating expenses ("OPEX").

BRIEF SUMMARY OF THE PRESENT INVENTION

In accordance with the present invention, a novel process and system has been developed utilizing assemblies of a plurality of separate $CO_2$ capture structures, each supporting substrate capture structures, which can include beds of substrate particles, that are combined with a single regeneration box, in a ratio dependent upon the ratio of the speed of adsorption from ambient air, or from whichever gas mixture is being treated to remove $CO_2$, compared to the speed of regeneration of the captured $CO_2$-laden sorbent. In preferred embodiments, the $CO_2$ capture structures are supported on a substantially continuous closed loop track, preferably forming a closed curve; upon which the $CO_2$ capture structures are moved longitudinally along the track, in succession, while being exposed to a moving stream of ambient air or a mixture of gases comprising a major proportion of ambient air. Alternatively, the capture structures can be moved longitudinally back and forth along an open-ended track.

At one location along the track, the longitudinal movement is halted and one of the $CO_2$ capture structures is moved into a sealed box for processing, to strip $CO_2$ from the sorbent and to regenerate the sorbent. When the sorbent is regenerated, the capture structures are rotated around the track until the next $CO_2$ capture structure is in position to enter the regeneration box, when the rotation of all of the $CO_2$ capture structures is next halted. The improvement of this invention provides for at least one of the capture structures to receive flue gas in place of ambient air, and preferably at least a majority of the other capture structures would be fed ambient air. Most preferably it would be the last station, or stage, before the regeneration box that receives the flue gas input, either pure, but pre-treated flue gas, or a mixture of flue gas and ambient air, what we shall refer to as carbureted flue gas.

The velocity and concentration of the input flue gas would be independently controlled on the input side though the output would be pulled out by fans with the possibility of using a separate manifold. Ideally in some circumstances, this may be a retrofit on to a pure DAC unit. It would add extra $CO_2$ and preheat the sorbent in the capture structure substrate, before entering the regeneration box. The cool down of the capture structure substrate and sorbent after the desorption in the regeneration box could remain unchanged, though the use of the heat removed might be different since the array has already been preheated before regeneration began. The advantages of this integrated approach over a separate DAC and carburetor unit are as follows:

1. Increases the overall production of $CO_2$ per DAC plant by an expected 30% to 50% and thus reduces the capex per tonne.
2. Reduces the capital cost of the flue gas capture component by using the same capital plant as with the DAC.
3. The energy used per tonne of $CO_2$ produced is reduced:
   A. because the amine sites binding the high concentration $CO_2$ have lower heats of reaction (note that a different sorbent, or a mixture of sorbents, such as a sorbent including a secondary amine, might be best for this embodiment, rather than only a sorbent with primary amines),
   B. because one has more $CO_2$ being generated for the same sensible heat, and
   C. because the heat coming out of the flue will be used to preheat the array.

There are three cases to consider:
1. The standalone case where the Cogen unit is sized to provide the heat and power for the system facility;
2. Connected to a larger Cogen facility, so the heat and flue gas $CO_2$ available is larger than will be used for the DAC unit and excess electricity and heat will be generated;
3. The case of a negative carbon power plant where one will be capturing the $CO_2$ from the power source and sizing the DAC provided, based upon the need to remove the flue gas $CO_2$ as well. (In this case one will be able to choose the amount of flue gas $CO_2$ captured based upon costs, because the facility overall is carbon negative (e.g. removing more $CO_2$ than is emitted by the power plant).

It will be observed that for all three aforementioned cases, the same design holds; all that one is changing is the size of the Cogen plant—determined in 1, above, by DAC energy needs; in 2, above, by the energy needs of the specific application (compression, etc.), and in 3 above, by the size of the carbon negative power plant.

It can also be argued that a world determined to reduce emissions would penalize a pure flue facility for the 10% coming out of the stack and give a credit for negative carbon produced in which case this embodiment could become the preferred embodiment both for climate change and economically. In this embodiment of the process, pure flue gas would be used at least in the last station of $CO_2$ capture immediately prior to regeneration.

Another preferred embodiment provides for the feed to include a previously pre- treated, or partially captured flue gas, for example the exhaust from the final or last capture structure, or the exhaust from a conventional $CO_2$ removal system, e.g., of the types long use in industries having large $CO_2$ containing exhaust, such as fuel burning power plants, cement manufacturing plants, steelmaking plants, and the like. Such systems involving the pretreatment of the flue gases are especially important when dealing with the exhaust from either solid, e.g. coal, or liquid e.g. petroleum oil, combustion processes, where particulates are likely to be present or non-particulate compounds toxic to the sorbent.

In one such system a plant which produces steam for heating the regeneration chamber provides the effluent which has to be treated in accordance with this improved invention. Such a system includes, for example, a standalone plant intended primarily to provide the steam for regenerating the sorbent. A $2^{nd}$ alternative is to use the plant for primarily co-generating another product, such as an electrical power plant, a cement plant or a steelmaking plant, as well as for example a petroleum oil refinery. The preferred example is where the cogenerating plant is one for producing fuel from the $CO_2$ produced from the plant of the present invention. A yet further preferred example is where the cogenerating plant produces fuel, from the $CO_2$, intended for sale or use in other locations.

When an adjacent plant is a power plant, the product of such plant includes cogenerated or surplus steam and electricity, including at least partially, the steam or electricity required for operating the DAC plant. The combustion effluent, or flue gas, from such power plant is at least partially cleaned before the effluent is fed to the final stage of $CO_2$ capture, immediately prior to entry into the regeneration chamber. In addition, as stated above, a partially $CO_2$ reduced effluent can be used either alone or in admixture with ambient air in the immediately preceding, or eighth position, of the capture structure; it is understood of course that where there are 10 capture structures, with a single regeneration chamber, the regeneration chamber is the $10^{th}$ stage and the immediately preceding capture structure stage, before the capture structure enters the regeneration chamber, is the $9^{th}$ stage, and the preceding stage is the $8^{th}$ stage. Examples of suitable structures for the system is shown in the drawings and descriptive text below.

Another preferred embodiment provides for the $CO_2$-laden feed to include a flue gas that had been previously partially treated to capture $CO_2$, for example the exhaust from the final or last capture structure or the exhaust from a conventional $CO_2$ removal system, conventionally used in industries having large $CO_2$ containing exhaust, such as fuel burning power plants, cement manufacturing plants, steelmaking plants, and the like. Such systems involving the pretreatment of the effluent, are especially important when dealing with the exhaust from either solid, e.g. coal, or liquid e.g. petroleum oil, combustion process, which often include fine particulate matter, solid or liquid particles, and gases toxic to the sorbent.

A further preferred embodiment is a situation where a plant produces fuel intended for sale or use in other locations, from the $CO_2$ produced from the DAC+ plant of the present invention.

Each capture structure is formed of a porous substrate having on its surfaces carbon dioxide adsorbing sites, preferably amine groups, and most preferably amine groups with a high proportion of primary amines. As the capture structures move along the track, they adsorb $CO_2$ from the moving gas streams until each capture structure reaches the sealed regeneration box. According to the present improvement, the process is further improved by passing flue gas, in place of ambient air, into each $CO_2$ capture structure during the portion of its movement around the loop several minutes before the $CO_2$ capture structure reaches the regeneration box.

As explained above, the present process invention, however, is a low temperature (preferably ambient-to-100° C.), semi-continuous process, with one-directional mass transport at each phase of the process. A further novel aspect of this process is that the reaction capturing the $CO_2$ from the gas mixture preferably occurs with a regenerable material (in one preferred embodiment on an aminopolymer), the regenerable material, e.g., an aminopolymer sorbent, being impregnated within the substrate.

The sorbent-supporting capture structures include in preferred embodiments, monolithic substrates supported in turn by 1. A framework that supports a substrate along the closed loop or open-ended line along which it moves during the $CO_2$ capture process. The substrate, in one preferred embodiment, comprises a porous monolith, having a sorbent impregnated within the pores of the monolith;
2. The substrate in one preferred embodiment of this invention, can be formed from a ceramic material, such as, e.g., from cordierite, mullite, silica, alumina, titania, silica mesocellular foam (MCF), and on mesoporous-γ-alumina, as well as on mesoporous-γ-alumina coated throughout the pores of MCF or other such material), metal oxides (e.g. silica, alumina, titania, or the porous oxides of other metals, single or mixed, having sufficient structural strength and resistance to heat to be able to maintain its monolithic shape under the conditions met during the $CO_2$ capture stage or during the regeneration of the sorbent, as described below). As the thermal conditions are not severe, other porous materials can be used such as porous fiberglass, rigid polymeric plastics, or other structurally strong, porous, materials, that can be formed into the desired shape by extrusion, corrugation, crimping, 3-D printing, or molding, or other known or to be developed procedures.
3. Impregnated Sorbent
   a. The most commonly used sorbents are aminopolymers:
      i. Polyethyleneimine (PEI) has been the sorbent of choice by most workers in the field, due to its
         1. High activity at low $CO_2$ concentrations, high amine density, commercial availability at scale;
         2. But it is limited by its known oxidative degradation at elevated temperatures.
      ii. Other aminopolymers can be used as sorbents, with varying degrees of primary, secondary and tertiary amines, as well as varying backbone chemistries, molecular weights, degrees of branching, and additives. Among the other known polyamines useful as a $CO_2$ sorbent are polypropylene amine, polyglycolamine, polypropylene amines poly(vinylamine), and poly(allylamine) and their derivatives.
      iii. Non-aminopolymer sorbents should be considered as useful sorbents:
         1. metalorganic frameworks, covalent organic frameworks, POMs, and other such materials are useful.
         2. Non-polymeric amine sorbents ("Ph-XX-YY"), oligomers.
         3. Improvements to the system can be achieved by the use of non-sorbent additives combined with the sorbent for increased stability (scavengers), activity (copolymers), accessibility (PEG), and many others known to the art, or to be developed in the future.

It is contemplated by the present invention that a contactor constructed out of active sorbent, (e.g. by 3D printing), may also be used.

ANALYSIS

In general, the DAC Removal system (the "System") will capture from the flue gas an extra fraction $FGCO_2$ per DAC cycle by feeding flue gas (preferably pre-treated) into the final stage of $CO_2$ capturing; this results in additional $CO_2$ ("FG $CO_2$") being captured, before the individual substrate enters the regeneration chamber. This will result in an increased efficiency in that last stage, thus increasing the amount of $CO_2$ captured during each cycle for the System. To first order, the CAPEX per tonne will decrease by $1/(1+FGCO_2)$ compared to a pure DAC (without the added flue gas). This results from the orders of magnitude increase in $CO_2$ concentration in the flue gas compared with in ambient air. The effect of the increased concentration differs with different sorbents. The capex cost of additional equipment when treating a mixture of air with a minor portion of flue gas in each stage, is also avoided.

If the Cogen plant burns M* (MMbtu) of natural gas per year, the amount of energy produced M for heat and electricity is given by M =COGENE×M* and the amount of energy to first order going out the flue, is MF=(1−COGENE)×M* where that energy does not include the energy of reaction of $CO_2$ if captured and water if condensed and COGENE is the energy efficiency of the Cogen unit. The amount of flue gas $CO_2$ emitted, FT $CO_2$ per year, is $FTCO_2$=0.056 M* tonnes per year.

If one captures that $CO_2$, from the flue gas, with an efficiency of capture ECF, then the amount of $CO_2$ captured from the flue gas per year is:

$$FGCO_2 = ECF \times FTCO_2.$$

The ratio of $FCCO_2$ to the total air $CO_2$ captured per year $DACCO_2$ is the same as it is per cycle. That implies that for a DAC unit, that captures $DACCO_2$ tonnes per year where:

$$DACCO_2 = (1/FGCO_2) \times ECF \times FTCO_2$$

the total $CO_2$ captured ($TCCCO_2$) will be determined from:

$$TCCO_2 = (1/FGCO_2 + -1) \times ECF \times FTCO_2.$$

The amount of $CO_2$ emitted is (1-ECF) $FTCO_2$. The overall plant is carbon negative by the amount $(1/FGCO_2+1) \times (ECF-1)FTCO_2$.

For ECF=0.9, (the air mixed with a minor proportion of flue gas ("carburetor") case), this will vary from $1.7FTCO_2$ ($FGCO_2$=.S) to $-0.8FTCO_2$ ($FGCO_2$=1). This means the smaller the amount of $FGCO_2$ flowing into the System, the more carbon negative the plant is, but the more carbon negative the plant is the less the reduction in the Capex. This is the expected result that the larger the fraction of flue gas captured the more the capex is reduced but the less carbon negative is the overall plant.

For the case where the Cogen unit is sized just to provide the heat and electricity for the DAC unit, with its $CO_2$ exiting through a $CO_2$ removal system, and where the total energy (heat plus electricity) is for example 6 MMbtu per tonne, the plant would be (1−0.9×6×0.056) carbon negative or about 0.7. This is clearly well matched to the case where $FGCO_2$ is equal to 1. But in the pure DAC case there is no extra electricity produced, so that the CAPEX cost is higher and one uses more energy per tonne captured. So, this integrated embodiment is preferred, e.g. less CAPEX, less energy used for capture and more carbon negative.

The next thing to assess is how much less energy is needed and thus how much extra electricity one can produce. If the energy needed per tonne of DAC produced is MDAC, and the energy needed for capturing the flue gas per tonne is MFG (for MFG we will assume no extra sensible heat component for the flue gas component and a reduced heat of reaction to liberate the $CO_2$), then the total energy needed for $CO_2$ capture per tonne is determined by:

$$MT\ CO_2 = \{(1/FGCO_2) \times MDAC + MFG)/((1/FGCO_2) + 1\} = (MDAC + FGCO_2 \times MFG)(1 + FGCO_2)\}.$$

This already saves energy per tonne compared to the DAC case of:

$$MDAC - MTCO_2 = (MDAC - J\backslash;1FG)\ FGCO_2/(1 + FGCO_2) = (SHA + AHR) \times (FGCO_2/(1 + FGCO_2))$$

where SHA is the full sensible heat and AHR is the reduction in heat of reaction for the flue gas component. There would also be a reduction in electricity use per tonne.

If one could in addition preheat the array so that ½ of the SHA was provided using the heat in the flue gas, then one would have an additional reduction of 0.5 SHA. Note that this heat comes from the flue gas stream and thus does not reduce the amount of electricity produced, since it normally is not used and thus is truly waste heat.

If one in addition recovered some of the SHA after regeneration one could in principle collect potentially ¾ of the sensible heat by swapping heat as has been done in a two-regeneration box system, as described, for example, in U.S. Pat. No. 9,925,488. It is possible that one could do that directly with the flue gas heat but that increase in temperature might reduce the extra $CO_2$ captured (here again there will be some tradeoff between capacity and kinetics). In some applications there might be use for low grade heat including preheating the water to the Cogen unit but in a highly preferred embodiment, the best result might be to make the regeneration faster because preheating is done during the last stage of adsorption.

In this regard it is worth noting that one has another degree of freedom in designing the flue gas stage. Namely the choice of the velocity and concentration of the flue gas stream, keeping the product constant so that it matches the rate of flue gas $CO_2$ being emitted. In general terms one wants a high concentration and low velocity because the low velocity will make the DAC monolith look like a higher CPSI. If the monolith has a 100 CPSI and has an attenuation exponent of 0.7 at 5 m/sec, at 1 m/sec the attenuation exponent would be 3.5. More generally another feature of this embodiment is that one can relax the capture efficiency from the flue gas stream but the overall result will still be carbon negative. Determining the optimal efficiency parameters for each system should be determined empirically from the velocity and concentration for the flue gas component being treated.

Thus, the remaining question becomes is there enough useable heat in the flue gas stream that passes through the contactor to provide the heat needed to preheat the substrate before regeneration. The heat needed to preheat the array can be provided by the heat produced by the condensing water, the heat of reaction of the $CO_2$ being captured from the flue gas stream and the sensible heat of the flue gas stream, as follows:

a. THF=total heat in flue gas=SHF+Heat of condensation of water vapor (HFCW) in the flue gas stream+heat of reaction of $CO_2$ (HFRC) per tonne of $CO_2$ collected during the last station before regeneration.

To make a very crude estimate whether there is enough heat available, assume the SHA is 2 MM BTU per tonne of $CO_2$, and the overall heat needed is 6 MM BTU which is about 30% of the energy released upon combustion per tonne of $CO_2$ released.

a. The capture of the $CO_2$ would not add much since it is only at best ½ of the total $CO_2$ collected and is at a lower heat of reaction.

b. SHF=sensible heat in flue gas per tonne of $CO_2$ collected=(1-COGENE) M*. If one is in the 70% range for COGENE, then 30% would be going up the flue; assuming ¼ of that heat is available (by cooling from 200° C. to 50° C.). This might be about ½ of what is needed.

However, the latent heat from the available water vapor in the flue gas entering the last stage of the $CO_2$ capture stage, would be sufficient to preheat the $CO_2$ capture unit before it enters the regeneration box. Therefore, in another preferred embodiment, the hot flue gas can be cooled down by evaporating water so that the incident flue gas stream was at a delta T (e.g., 70° C). higher than the final temperature, e.g. 60° C., but had a high water vapor content, sufficient water vapor to contain more than the amount of latent heat needed to raise the substrate ("SA") temperature to 60° C. It is worth noting that in this case the preheating has 90seconds to occur. The velocity is assumed to be 1 m/sec, and the flue gas generally contains at least about 10% water, the equivalent to an input of pure steam during 30 seconds at 300 cm/sec, which is clearly much more than needed. However, the excess water generated this way, would be a valuable byproduct in locations, such as desert areas, where water is costly, e.g., the Southwest of the U.S. or desert areas of Africa or Asia. If the SA enters the regeneration box at 60° C., it would allow for the reduction in pressure to 0.2 bar without cooling the regeneration box significantly; and in fact by further reducing the pressure it would be possible to cool down further, but use the water vapor to sweep out any trapped flue gas.

Once sealed within the regeneration box, the sorbent is treated, for example by heating with steam, to cause the $CO_2$ to be stripped from the sorbent, regenerating the sorbent. The stripped $CO_2$ is removed from the box and captured. The capture structure with the regenerated sorbent then moves out of the sealed box and moves along the track with the other capture structures to adsorb more $CO_2$, until the next capture structure is moved into position to be moved into the regeneration box. At the stripping/regeneration location, the capture structures can be moved into a box located above or below the grade of the track, or the box can be located so that the capture structures moves into the box at the same grade level as the track, forming a seal with the capture structures. These several alternatives are further defined below and diagrammed in the accompanying drawings.

In the instances where the regeneration box is below or above grade, the system must include a sub-system for raising or lowering the capture structures. In systems where the regeneration box is on grade with the tracks, a satisfactory sealing arrangement is required, for providing a seal along the sides as well as along the top and/or bottom surfaces.

CO2 ADSORPTION AND REMOVAL PROCESS

The basic premise of this process is that $CO_2$ is adsorbed from the atmosphere by passing air or a mixture of air and effluent gas, through a sorbent bed, preferably at or close to ambient conditions. Once the $CO_2$ has been adsorbed by the sorbent, the $CO_2$ has to be collected, and the sorbent regenerated. The latter step can be performed by heating the sorbent with steam in the sealed containment box to release the $CO_2$ and regenerate the sorbent. The $CO_2$ is collected from the box, and the sorbent is then available to re-adsorb $CO_2$ from the atmosphere when it leaves the regeneration box.

It is well known that most available sorbents are susceptible to being degraded and thus de-activated if exposed to air at above a certain temperature. Thus, the sorbent on the substrate often has to be cooled before the capture structures leaves the regeneration box and is returned to the air stream.

In another preferred embodiment of the process of this invention, flue gas, preferably in a purified form after removing any particulate solid or liquid material and any gaseous materials toxic to the sorbent, is flowed through the capture structure immediately before the capture structure enters the regeneration chamber. This flue gas treating stage is preferably carried out in a closed chamber, such that the pre-treated flue gas is unable to escape into the environment before passing over a major surface of the porous substrate in the capture structure.

Generally, the period of time required for adsorption of $CO_2$ from ambient air is greater than the adsorption time from the flue gas, with its far greater concentration of $CO_2$. With the current generation of sorbent this difference will require an adsorption period, when treating ambient air, approximately ten times greater, compared with the time required for $CO_2$ release and sorbent regeneration. Thus, a system with ten capture structures and a single regeneration unit has been adopted as the current basis for an individual rotating system, based upon the use of a polyethyleneimine sorbent. If the performance of the sorbent is improved over time, this ratio of adsorption time to desorption time, and thus the number of capture structures required in a system, could be reduced.

In particular, if a higher loading embodiment of the sorbent is used, a one-hour adsorption time would be viable, thus requiring one regeneration box to serve only five capture structures. In addition the relative treatment times will vary with the concentration of $CO_2$ in the gas mixture treated, such that the higher the $CO_2$ content, the shorter the adsorption time relative to the regeneration time, e.g., by mixing a combustion effluent ("flue gas") with the ambient air through a gas mixer, or "carburetor", the mixture has a significantly higher concentration of $CO_2$ than air but a significantly lower concentration than the pure flue gas.

To insure more complete removal of the $CO_2$ from the flue gas, the effluent from the ninth, or final stage immediately before regeneration, is passed back into a second chamber, preferably to the immediately preceding stage, i.e., the eighth stage of the adsorbing cycle of the capture structures.

The process of the present invention, in all of the above embodiments, remains a low (i.e. ambient −100° C. or less) temperature batch process, with one-directional mass transport at each phase of the process.

The chemical and physical activity within the capture structures, and the mechanics of the capture structures and regeneration chambers, both during at least the first 7 stages of the adsorption cycle and the regeneration cycle in the sealed box, is substantially the same as is described in. U.S. Pat. Nos. 10,413,866 and 10,512,880. The disclosures of those patents are incorporated by reference herein as if repeated in full, as modified by the new disclosure presented herein. In the system according to the present invention, each rotating system provides one sealable regeneration box for each group of rotating capture structures, the number of capture structures being dependent upon the relative times to achieve the desired adsorption and the desired regeneration. In addition, it has been found that, in certain of the preferred embodiments, greater efficiencies and lower costs are achieved by spatially relating and temporally operating two of the rotating systems in a suitable relationship to allow the regeneration boxes for the two rotating capture structure systems to interact, such that by offsetting the time each enters a regeneration box, the second is preheated by the remaining heat in the first to enter its regeneration box, as a result of the regeneration procedure in the first box; this also efficiently cools down a regenerated capture structure before it is returned to its adsorption cycle on the rotating track.

This interaction between the regeneration boxes is achieved in accordance with this invention, by lowering the pressure of the first box system so that the steam and water remaining in the first box evaporate after the release of $CO_2$, and the system cools to the saturation temperature of the steam at its lowered partial pressure. Furthermore, as described below, the heat released in this process is used to pre-heat the second sorbent capture structure and thus provides approximately 50% sensible heat recovery, with a beneficial impact on energy and water use. This concept can be used even if an oxygen resistant sorbent is utilized. The use of a less oxygen-sensitive sorbent at higher temperatures will result in the performance being improved over time. It should be understood that due to the greater concentration of the direct flue gas injection in at least the last stage just preceding the regeneration box, and possibly in the preceding one or more stages, the sorbent and substrate will be at a higher temperature due to the greater concentration of $CO_2$ being sorbed onto the sorbent, and the exothermic nature of the sorption reaction. This can allow for avoiding the necessity of reducing the pressure in the regeneration chamber to as low a vacuum as required when dealing with the treatment of ambient air alone or when mixed with a minor proportion of a flue gas.

As discussed in the earlier patents, above, the sorbent capture structure is preferably cooled before it is exposed to air so as to avoid de-activation by the oxygen in the air. It is possible to utilize sorbents that have a greater resistance to thermal degradation, such as, poly(allylamine) and poly (vinylamine) and their derivatives, among the polyamines, as described in co-pending U.S. application Ser. No. 14/063, 850. The cooling, if necessary, can be achieved by lowering the system pressure in the regeneration box, thus lowering the steam saturation temperature. This has been shown to be effective in eliminating the sorbent deactivation issue as it lowers the temperature of the system. There is thus a significant amount of energy removed from the first capture structure that is cooled during the de-pressurization step. Each time a $CO_2$-laden substrate that has completed its $CO_2$ adsorption stages and entered the second regeneration box, it has to be heated to release the $CO_2$ and regenerate the sorbent. This heat could be provided solely by the atmospheric pressure steam supplied to the regeneration box, but this is an additional operating cost. In order to minimize this operating cost, a two-bed design concept had been developed. In this concept, as described in U.S. Pat. No. 10,512, 880, the heat that is removed from the first regeneration box that is being cooled by reducing the system pressure in that first regeneration box (and thus the steam saturation temperature), is used to at least partially pre-heat the $CO_2$-laden substrate to be regenerated in the second regeneration box. Thus, the steam usage is reduced by using heat from the cooling of the first box to increase the temperature of the second box. The remaining heat duty for the second box is achieved by adding steam, preferably at atmospheric pressure. This process is repeated for the other rotating capture structures as they enter and leave the two regeneration boxes, which greatly improves the thermal efficiency of the system.

The several acronyms used above can be defined as follows:

$FG-CO_2$=fraction of $CO_2$ relative to air $CO_2$ captured per cycle that is flue gas DA. $CO_2$=amount of air $CO_2$ captured per cycle
FGCAPEX=flue gas CAPEX in a pure carburetor embodiment, that is where a mixture of ambient air and flue gas is fed to each capture structure, M*=total natural gas burnt in MMBTu
M=useable heat and electricity produced
COGENE=cogen efficiency=M/M*
$FGCCO_2$=Flue gas $CO_2$ captured per year
$DACCO_2$=air $CO_2$ captured per year
$FTCO_2$==total flue gas $CO_2$ produced in burning J\11* natural gas
$MTCO_2$=total $CO_2$ captured/year=total $CO_2$ from flue gas and air captured/year
ECF=efficiency of flue gas capture
MDAC=energy per tonne of air $CO_2$ captured
MFG=energy per tonne of flue gas $CO_2$ captured
SHA=sensible heat of monolith array
Delta HR=difference in heat of reaction between DAC $CO_2$ and flue gas $CO_2$ sites
THF =total heat sources in flue gas steam -sensible heat+$CO_2$ heat of reaction+water condensation heat— (Note heat values of natural gas are not consistent)

These and other features of this invention are described in, or are apparent from, the following detailed description, and the accompanying drawings.

BRIEF DESCRIPTION OF THE FIGURES AND EXHIBITS

FIG. 1 is a diagrammatic top view of a mutually interactive pair of rotating multi-capture structures systems for removing carbon dioxide from the atmosphere according to an exemplary embodiment of this invention, showing a grade level regeneration chamber for each loop and group of capture structures, and the two capture structures immediately upstream from each of the regeneration chambers are shown within sealable housings provided with sealable conduits for feeding cleaned flue gas to the capture structures;

Figure 8:
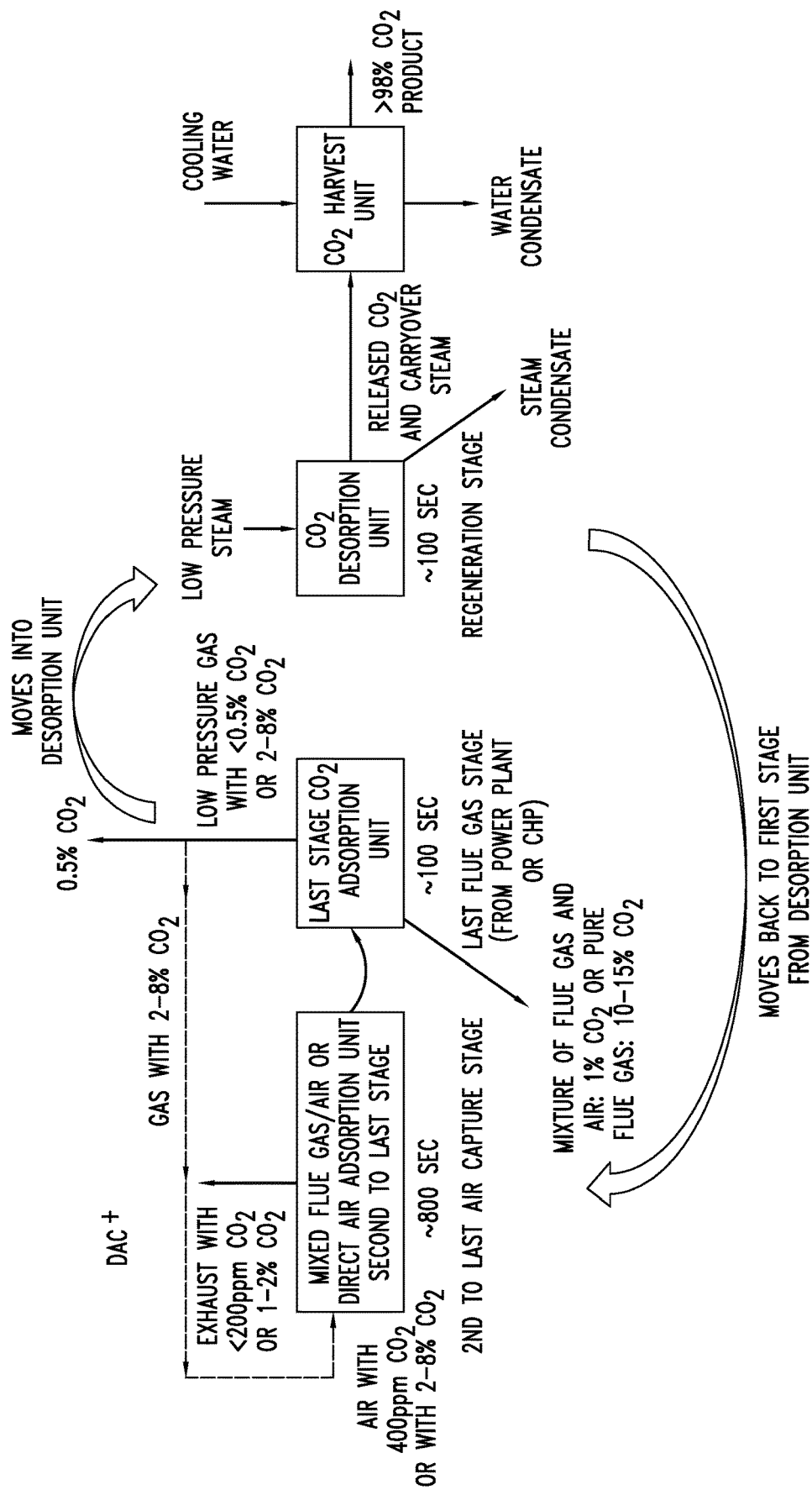
Figure 9:
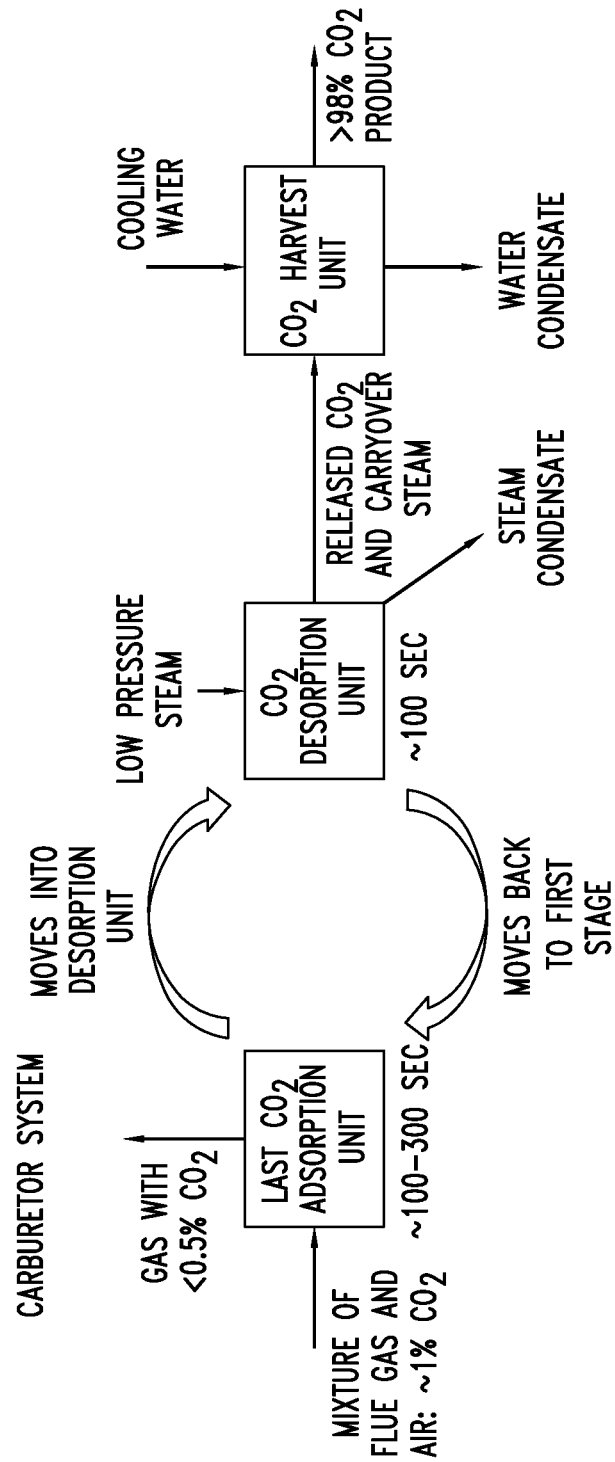
Figure 10:
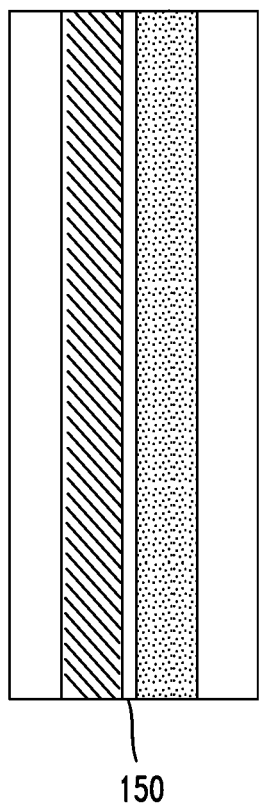

FIG. 8 is a conceptual diagram showing the general operation of one of the preferred embodiments of the invention of this system, between the last adsorption-flue gas stage and the $CO_2$ Desorption and Regeneration Step, in this embodiment the last adsorption stage, e.g., the ninth stage, immediately upstream from the "desorption unit" receives flue gas, either pure or mixed with ambient air, and the next preceding stage, e.g., the eighth stage, can receive the exhaust from the ninth stage, a mixture of that exhaust and ambient air, or only ambient air, depending upon the composition of the ninth stage exhaust;

FIG. 9 is a conceptual diagram showing the general operation of another preferred embodiment of the invention of this system, between the last adsorption-mixed air-flue gas stage and the $CO_2$ Desorption and Regeneration Step, in this embodiment the last adsorption stage, e.g., the ninth stage, immediately upstream from the "desorption unit" receives flue gas, either mixed with ambient air; and FIG. 10 depicts one example of the seals which extend around all sides of each capture unit in the desorption unit or in one of the flue gas adsorption units housing, when each of the housings is on the grade level and the capture structures enter each housing as each capture structure moves along the track.

MORE DETAILED DESCRIPTION OF THIS EMBODIMENT OF THE PRESENT INVENTION

A simplified depiction of the design for a system to perform these operations described above, is shown in FIGS. 1 through 6. A detailed discussion of the operation and the ancillary equipment that will be required is set out below and is similar to that shown in commonly owned U.S. Pat. Nos. 10,413,866 and 10,512,880.

In this embodiment, there are ten "capture structures," preferably but not necessarily, located in a decagon arrangement and which are located on a substantially circular or arcuate track. There are two substantially circular (or ovoidal)/decagon assemblies associated with each process unit and they interact with each other as shown. In this preferred embodiment, air is passed through the capture structures by induced draft fans located on the inner sides of the capture structures. At one location the capture structures are in a position adjacent to a single sealable chamber box, into which each capture structure is inserted, as it moves along the track, for processing. In the sealable regeneration chamber box they are heated to a temperature of not greater than 130° C., and more preferably not above 120° C., and optimally not greater than 100° C., preferably with process heat steam to release the $CO_2$ from the sorbent and to regenerate the sorbent. Alternatively, the regeneration chamber can be above or below grade. In this embodiment, the adsorption time for adsorbing $CO_2$ by the capture structures is preferably ten times as long as the sorbent regeneration time.

It should be understood that although the use of porous monolithic substrates in the capture structures is preferred, if feasible one may use stationary beds of porous particulate, or granular, material supported within a frame on the capture structures. In either case, the porous substrate preferably supports an amine sorbent for $CO_2$, when the particle capture structure has the same pore volume as the monolith capture structures for supporting the adsorbent.

The schematic drawings depict in a diagrammatic form a basic operational concept of the system according to the present invention. There are ten "capture structures" 21, 22 located in each decagon assembly arrangement and which are movably supported on a circular track 31, 33. There are two circular/decagon assemblies, A, B, associated with each process unit and they interact with each other. Air or flue gas is passed through each of the capture structures 21, 22 by induced draft fans 23, 26, located radially interiorly of each of the decagon assemblies, and inducing a flow of exhausted gas out of the inner circumferential surface of each capture structures, and up away from the system. At one location along the track 31, 33, the capture structures 21, 22 are adjacent to a sealable regeneration box 25, 27 into which the capture structures 22, 22 are inserted for regeneration processing after having completed one rotation around the track.

Figure 1:
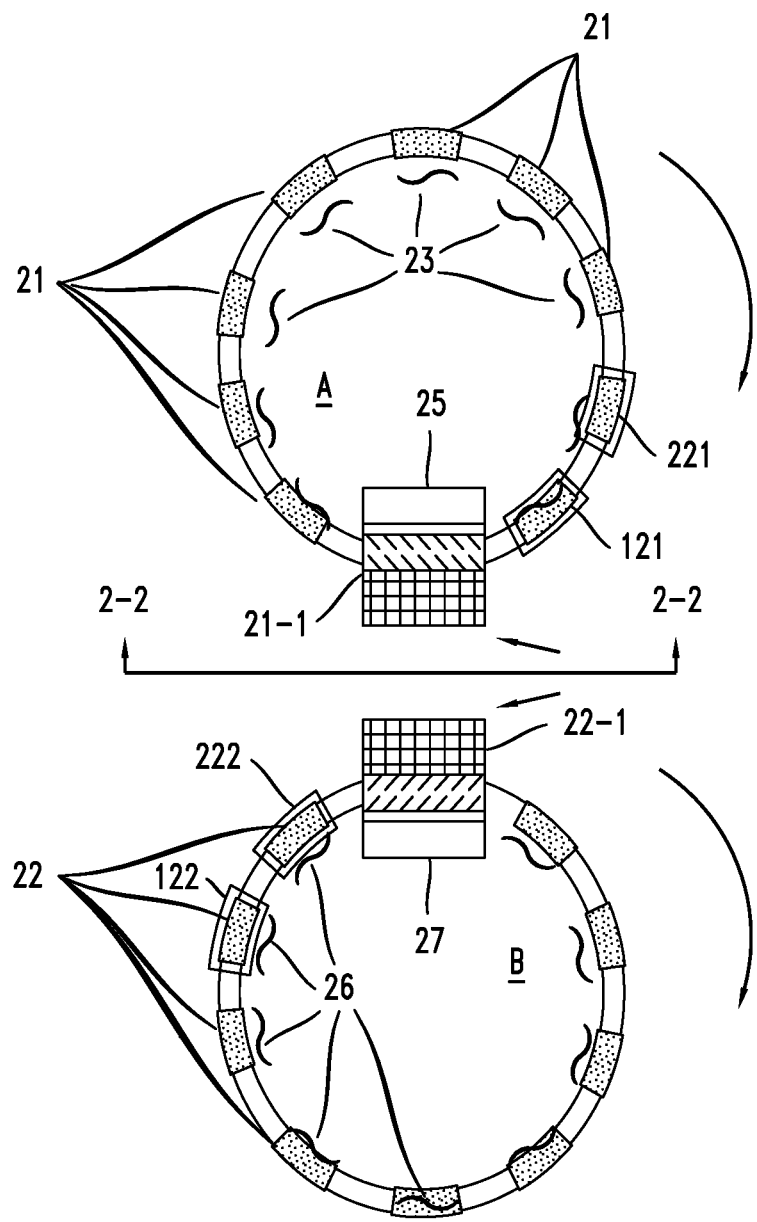
Figure 2:
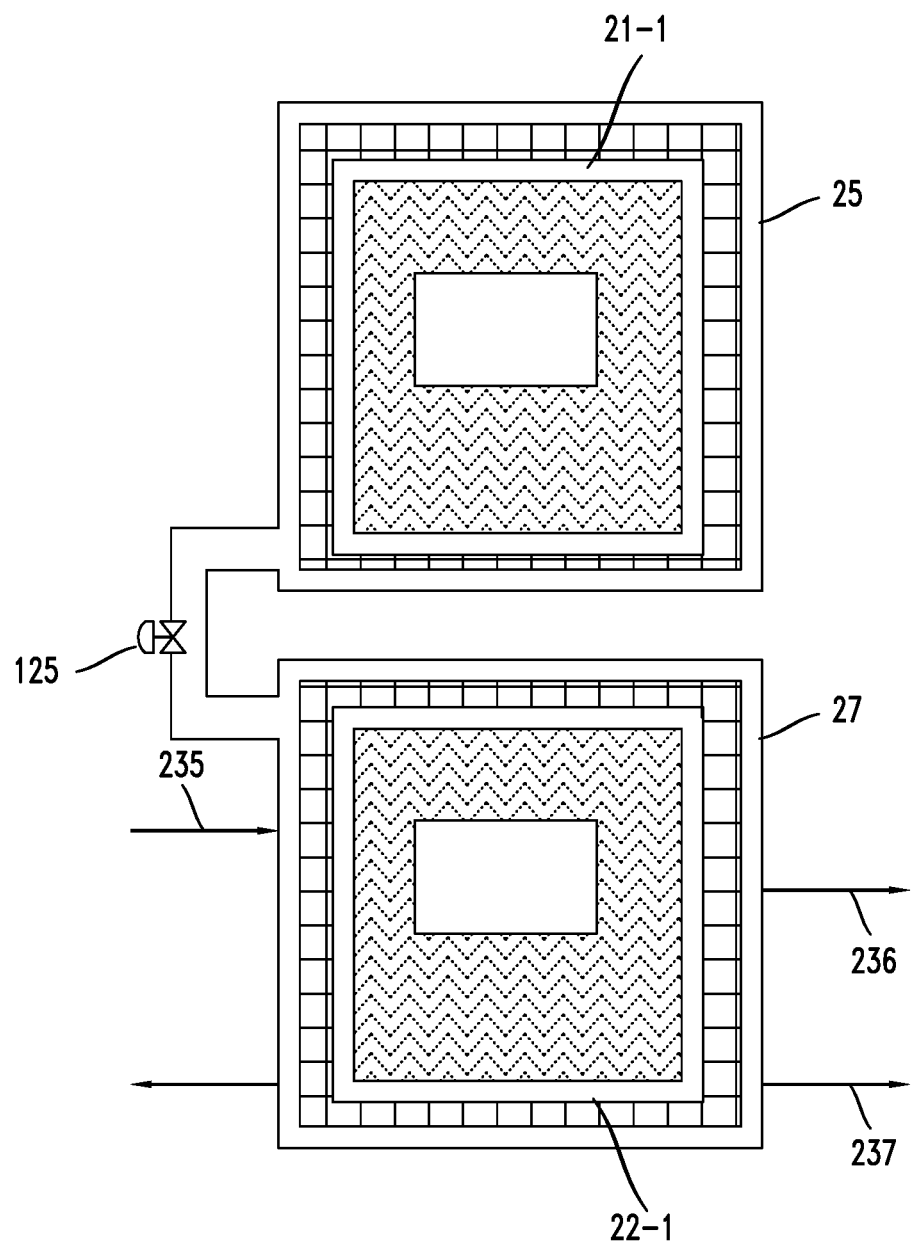
FIG. 2 is a schematic illustration of the pair of regenerating chambers for removing carbon dioxide from the capture structures of FIG. 1, showing the several inlet and outlet conduits connected to one of the chambers and the sealable connecting conduit connecting the two chambers.
Figure 3:
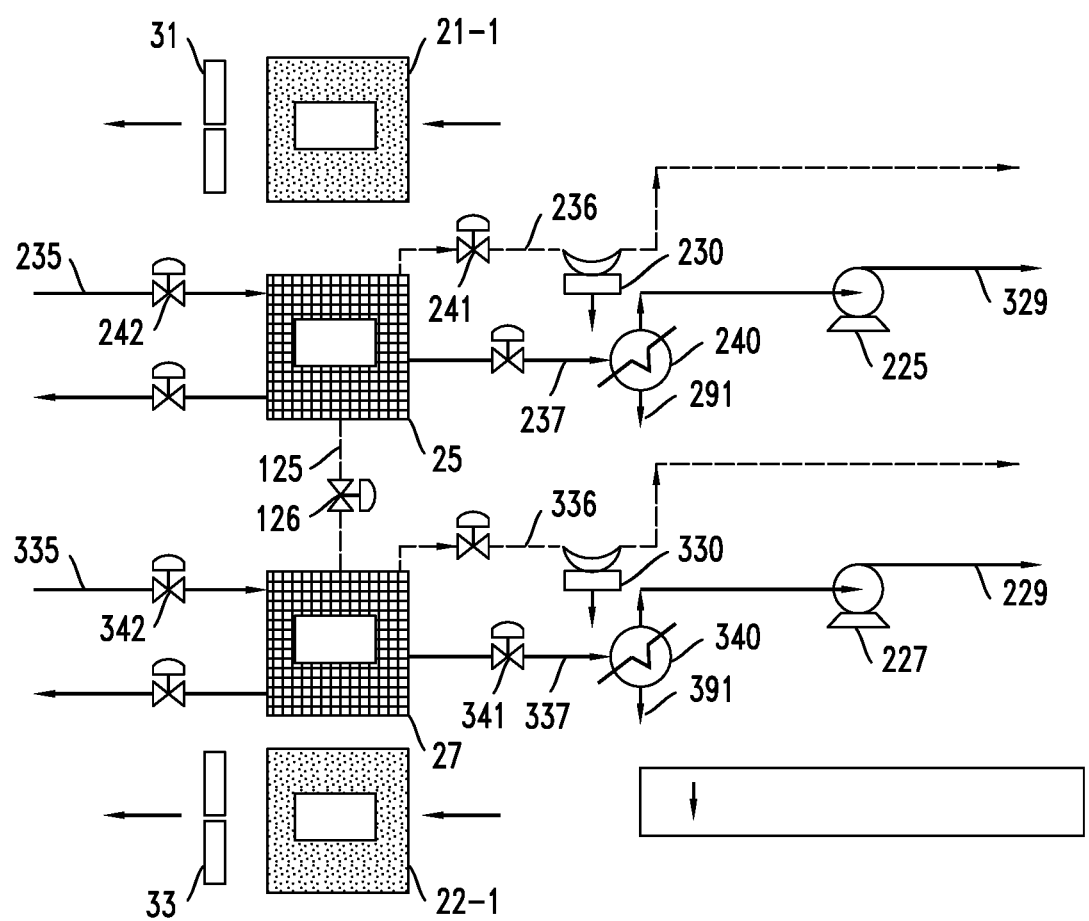
FIG. 3 is a schematic view of the regeneration chambers and flue gas capture structures on each of the adjacent loops showing a piping system arrangement for each chamber and between the chambers.
Figure 4:
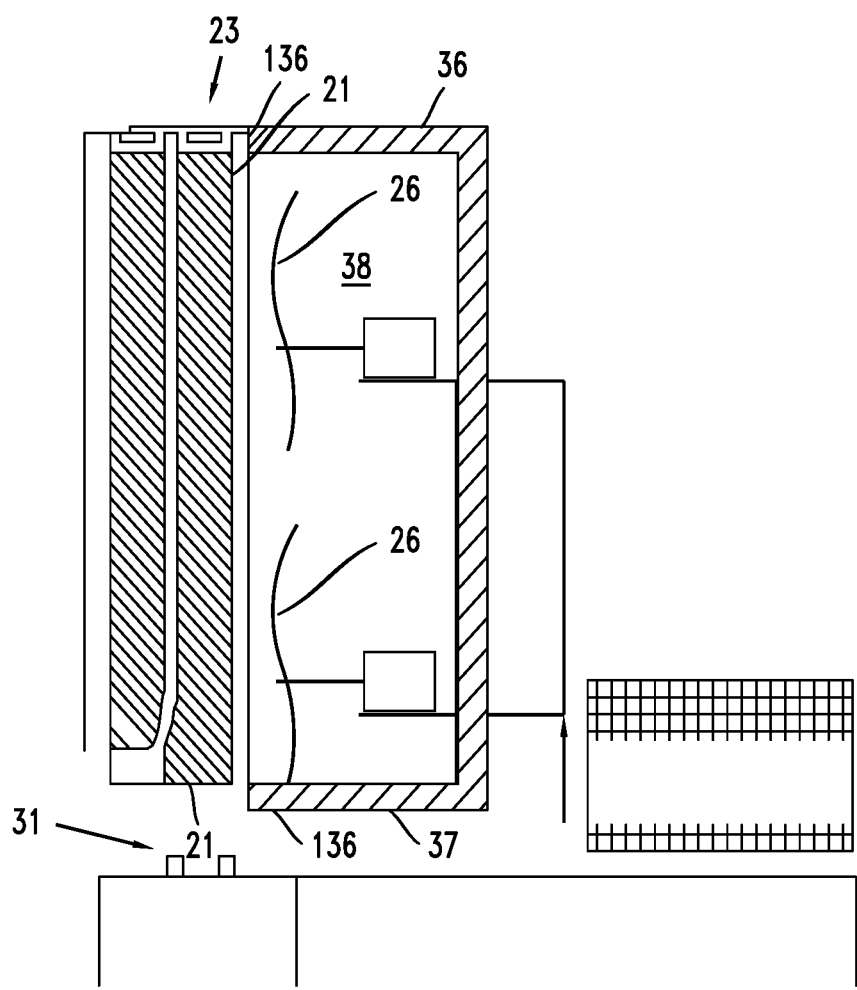
FIG. 4 is a schematic elevation view showing fans which are relatively stationary and which rotate with each capture structures, respectively.
Figure 5:
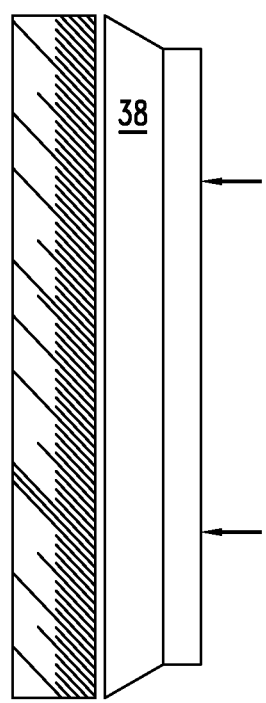
FIG. 5 is a diagrammatic side elevation view of a Design for Dual Induced Axial Fans and Plenums of FIG. 4.
Figure 6:
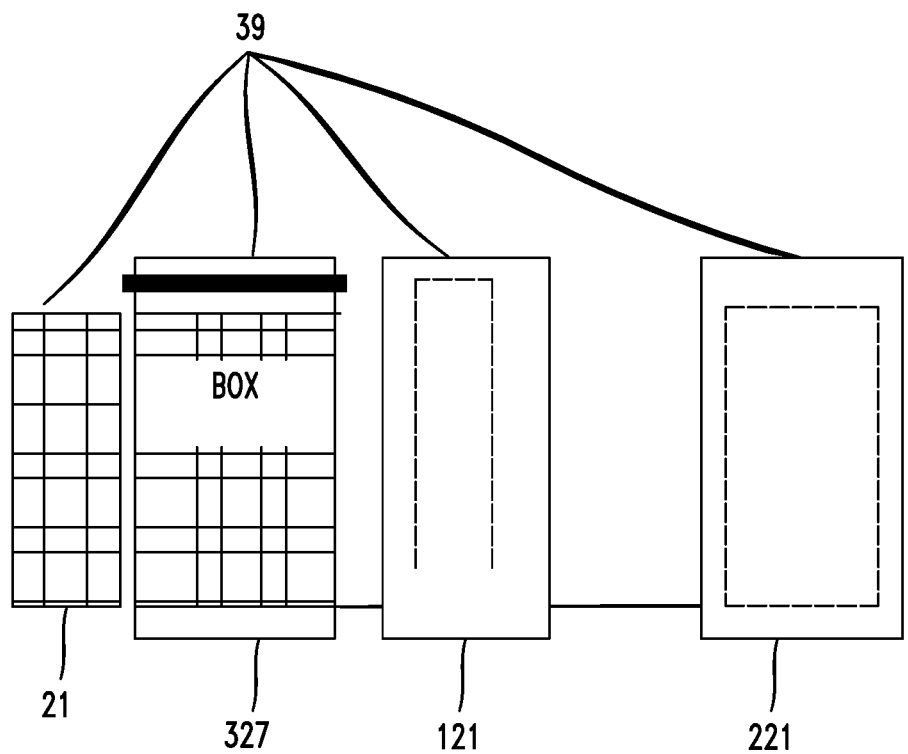
FIG. 6 is a diagrammatic elevation view of one of the mutually interactive pairs of rotating multi-capture structures system, showing the track level regeneration chamber for removing carbon dioxide from the atmosphere, and the immediately preceding two capture structure housings for treating a flue gas stream for $CO_2$ capture.
Figure 7:
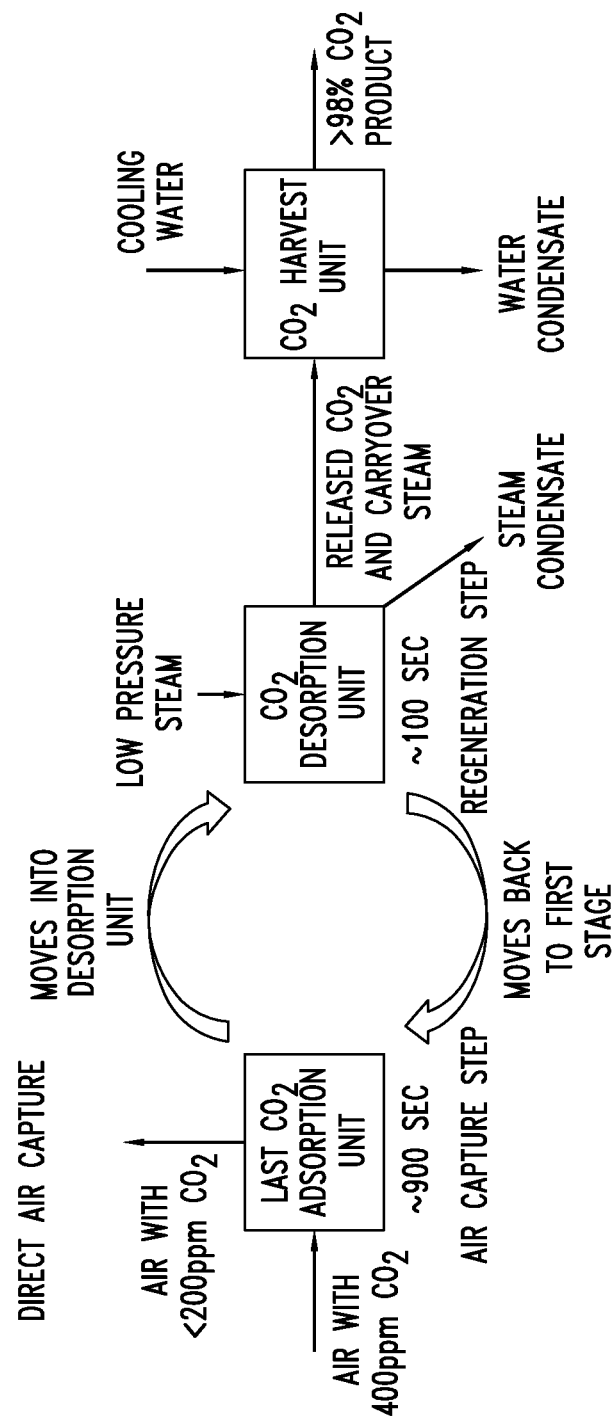
FIG. 7 is a conceptual diagram showing the general operation of this system between the last adsorption stage and the $CO_2$ Desorption and Regeneration Step, showing a system where the adsorption stages all treat ambient air.

Thus, as shown in FIGS. 1 and 2, a first capture structure 21 is rotated into position within the regeneration box 25 for processing; for the on grade regeneration box 25. When a capture structure is in position within the regeneration box 25, movement along the track is halted for all of the capture structures. Alternatively, by increasing the diameter of the track, and the capture structure, a constant motion is made possible by having suitable sealing systems on the regeneration box, and on any flue gas adsorption housings (121, 221, 122, 222). When a capture structure 21,22 has been regenerated, as all of the capture structures move, the regenerated capture structure is moved out of the regeneration box 25, 27, so that the next capture structure 21, 22 can be moved in after having treated the flue gas, as shown in FIG. 1. This process is repeated substantially continually. In the preferred embodiment shown in the drawings, one or more of the capture structures on each track will move out of the flue gas adsorption housings (121, 221, 122, 222), as the timing is preferably matched to the timing of the flue gas desorption. Alternatively, the capture structures motion can be halted each time a capture structure enters a regeneration box and one or more flue gas adsorption housings (121, 221, 122, 222), and the motion is then restarted when the desorption and flue gas adsorption are completed.

As explained above, the present process invention, however, is a low temperature (preferably ambient-to-100° C.), semi-continuous process, with one-directional mass transport at each phase of the process. A further novel aspect of this process is that the reaction capturing the $CO_2$ from the gas mixture preferably occurs with a regenerable material (in one preferred embodiment on an aminopolymer), the regenerable material, e.g., an aminopolymer sorbent, being impregnated within the porous substrate.

The sorbent-supporting capture structures include in preferred embodiments, monolithic substrates supported in turn by a framework to form each capture structure.

The two decagon ring assemblies operate together, although the capture structures for each decagon ring are moved in and out of their desorption./regeneration boxes at slightly different times, as explained below, to allow for the passage of heat, e.g., between box 25 and box 27, when regeneration in box 25, for example, is completed to provide for preheating of the other box, e.g. regeneration box 27. This saves heat at the beginning of the regeneration and reduces cost of cooling the capture structure after regeneration.

Three locations for the regeneration boxes 25, 27 are available, i.e., above or below the rotating capture structures, which do not permit continuous motion, or at grade level. See U.S. Pat. Nos. 10,413,866 and 10,512,880.

The regeneration chambers 321, 327 are located on grade with the rotating capture structure assemblies. The boxes are located with adequate access for maintenance and process piping also on grade. Suitable mutually sealing surfaces are located on the box and on each capture structure, so that as the capture structure moves into position in the box, the box 322, 327 is sealed, regardless of whether the motion is upward, into an elevated regeneration box, downward into a sub-grade regeneration box, or straight ahead for an on-grade regeneration box; the same is true for the embodiments where the flue gas adsorption housings (121, 221, 122, 222) can be on grade or below or above grade. There are also optional closed chambers for the immediately preceding positions along the track for the feeding of flue gas or partially cleaned flue gas into the capture structures.

In all cases ancillary equipment (such as pumps, control systems, etc.) are preferably located at grade within, or outside of the circumference of the track supporting the rotating capture structure assemblies 29.

The regeneration boxes and housings can be located at different levels, in particular situations without departing from the concept or scope of this invention.

An alternative design coming within the scope of the present invention provides for a system where the pair of regeneration boxes, chambers 25, can move along the track. This would be best used where the track design allows for reciprocating movement by the capture structures along a straight track, so that the regeneration boxes 25 would not become widely separated. Compared to prior disclosed apparatus in the prior art, this would:

Minimize structural steel;

Place all major equipment at grade level apart from the regeneration boxes which are only acting as containment vessels;

Ensure that there is no interference with air flow to the capture structures, where the boxes are at different levels from the track;

Avoid movement of the larger multi-unit system of rotating all of the capture structures to move them into a regeneration box;

Allow the two regeneration boxes to be adjacent to each other with minimum clearance to permit the heat exchange desirable for increased efficiency.

The mechanical operations, with necessary machinery and power, that are required include:

Rotation of the two sets of capture structure assemblies around a substantially circular track on a support structure, precisely locating elements to a position where the capture structures are to be stopped, so as to ensure the free movement of the capture structures into and out of the regeneration box and any flue gas adsorption housings.

Removal of the capture structure, or the substrate only, insertion of the capture structure into the regeneration box, removal of the capture structure from the regeneration box and re-insertion of the capture structure into its position on the track assembly. All of these movements occurring in a vertical direction, or alternatively as part of the horizontal rotational movement on the track. The capture structures and regeneration boxes are designed so that, for vertically movable capture structures there is a substantially air-tight seal between the top or bottom of each of the capture structures and the support structure of the box. For on grade such regeneration boxes or flue gas adsorption housings, the seals can be on the side surfaces as well as the top and bottom surfaces, or there could be sealing doors that shut when a capture structure moves into the regeneration box or flue gas adsorption housings. Examples of some conceptual designs for such seals are shown in previously issued U.S. Eisenberger patents and by FIG. 10 of this application.

In all cases of one preferred embodiment, referring to FIGS. 1-9, a capture structure 21-1 (ring A) is rotated into position and then moved into the regeneration, or desorption, box 25 for processing. The pressure in desorption box 25 (containing capture structure 21-1, ring A) is reduced using, e.g., a vacuum pump 230, to less than 0.2 Bar. The box 25 is heated with steam at atmospheric pressure through line 235 and $CO_2$ is generated from capture structure 21-1 and removed through the outlet piping 237 from the box 25 for the $CO_2$ and condensate which is separated on a condenser 240 (FIG. SA). Capture structure 22-1 (ring B) is then placed in box 27 (ring B) while box 25 is being processed, as above (FIG. 5B). The steam supply to box 25 is stopped and the outlet piping for the $CO_2$ and condensate isolated. Box 25 and box 27 are connected by opening valve 126 in connecting piping 125 (FIG. SC).

The pressure in box 27 is lowered using a vacuum pump 330 associated with box 27. This lowers the system pressure in both boxes and draws the steam and inert elements remaining in box 25 through box 27 and then to the vacuum pump. This cools box 25 (and thus capture structure 21-1, ring A) to a lower temperature (i.e. the saturation temperature at the partial pressure of the steam in the box) and reduces the potential for oxygen deactivation of the sorbent when the capture structure 21-1 is placed back into the air stream. This process also pre-heats box 27 (and thus capture structure 22-1, ring B) from ambient temperature up to the saturation temperature at the partial pressure of the steam in the box 250. Thus, energy has been recovered and the amount of atmospheric pressure steam required to heat the second box 27 (and capture structure 22-1 ring B) is reduced (FIG. SD). As the vacuum pump 330 lowers pressure in the boxes 25 and 27, the first box 25 is reduced in temperature (from 100° C. approx. to some intermediate temperature) and the second box 27 is increased in temperature (from ambient to the same intermediate temperature). $CO_2$ and inert gases are removed from the system by the vacuum pump 330.

The valve between the first box 25 and the second box 27 is closed and the boxes isolated from each other. Capture structure 21-1 ring A is now cooled below the temperature where oxygen deactivation of the sorbent is of concern when the capture structure is placed back in the air stream. The second box 27 and capture structure 22-1, ring B, have been preheated and thus the amount of steam required for heating the box and capture structure is reduced (FIG. 5E). Capture structure 21-1 ring A is then moved out into the capture structure assembly. The ring A capture structure assembly is rotated by one capture structure and capture structure 21-2 ring A is then inserted into box 25, where it is ready for preheating. Box 27 is heated with atmospheric steam and the stripped $CO_2$ is collected (FIG. 5F).

When the second box 27 (containing capture structure 22-1 ring B) has been fully regenerated the steam supply to box B is isolated, and the piping for the $CO_2$ and condensate is isolated using valves 241, 242. The valving 126 between the first box 25 and the second box 27 is opened and the pressure in the boxes 25, 27 is reduced using the vacuum pump 230 system for box 25. The temperature of the second box 27 (and thus capture structure 22-1, ring B) is reduced (see 5 above). The temperature of the first box 25 (containing capture structure 21-2, ring A) is increased (see 5 above) (FIG. 5G). The vacuum pump 230 lowers pressure in boxes 25, 27. Box 25 is reduced in temperature (from 100° C. approx. to some intermediate temperature). Box 27 is increased in temperature. (from ambient to the same intermediate temperature). $CO_2$ and inert gasses are removed from the system by the vacuum pump 230. Capture structure 22-1, ring B, is moved back into the ring assembly and the assembly rotated one bed. Capture structure 22-2, ring B, is then inserted into box 27. Box 25 (containing capture structure 21-2 ring A) is heated with atmospheric steam to release the $CO_2$ and regenerate the sorbent (FIG. 5H) The pre-heating of box 27 then occurs as described above. The process is repeated for all of the beds as the Decagons are rotated many times.

When dealing with a preferred embodiment as depicted in FIG. 8, wherein both rings include a pair of flue gas adsorption housings immediately preceding the entry into the regeneration box, the feed of a preferably pre-treated flue gas is provided. The e.g., ninth adsorption stage immediately preceding the regeneration box, is fed with either a pre-treated flue gas having usually about 10-15% $CO_2$, or a mixture of the pre-treated flue gas with ambient air. The exhaust from that stage can contain, e.g., from 2to 8% $CO_2$. Preferably, when the upper range of $CO_2$ is exhausted, the exhaust gas is most preferably passed into the immediately preceding desorption stage housing for further adsorption to reduce the exhaust gas to a suitable degree to be exhausted to the atmosphere.

PREFERRED DESIGN PARAMETERS

The current preferred basis for the design of the system is as follows:
Weight of individual capture structures to be moved:
1,500-10,000 lbs. (including support structure)
Approximate size of bed: Width-5-6 meters
Height-9-10 meters
Depth-0.15-1 meter
It should be noted that the capture structure dimensions could be adjusted depending upon the particular conditions at the geographic location of each pair of systems, and the desired, or attainable, processing parameters.

For a system including 10 capture structures in each of the Decagon rings, the outer dimensions of a preferred circular/decagon structure would be about 15-17 meters, preferably about 16.5 meters. The capture structures support structures may be individually driven, for example by an electric motor and drive wheel along the track, or the support structures could be secured to a specific location along the track and a single large motor used to drive the track and all of the structures around the closed loop. In either case, the regeneration box is placed at one location and all of the structures can stop their movement when one of the support structures is so placed as to be moved into the regeneration box. The economics of a single drive motor or engine, or multiple-drive motors or engines, will depend on many factors, such as location and whether the driving will be accomplished by an electrical motor or by some fuel-driven engine. The nature of the driving units is not, itself, a primary feature of this invention, and many are well-known to persons skilled in the art. Examples of suitable engines include internal or external combustion engines or gas pressure driven engines, for example operating using the Stirling engine cycle, or process steam engines or hydraulic or pneumatic engines.

When a regeneration box is located above the track level, the top will be about 20 meters above the grade of the track, and when the regeneration box is located below the grade of the track, the top of the box will be immediately below the track grade. A box on grade will only be minimally above the tops of the capture structures, so as to accommodate the capture structures wholly within the box during regeneration.

Where the regeneration box is not on grade, the elevator system for moving the capture structures into and out of the regeneration box should be able to accomplish the movement into and out of the box during a period within the range of 30 seconds to 120 seconds, and preferably between 30 and 45 seconds. The shorter the time period, the greater the flexibility in the process parameters that are available for the process. It is recognized that there are certain inherent mechanical limitations in moving the massive capture structures.

One advantage where the regeneration box is on grade, is that vertical movement is not needed, as the capture structures merely rotates into the box, as part of its rotational movement, and seals; thus avoiding the vertical movement, the loss of time and the additional capital cost of the elevators. In each case, the two edges of the capture structure are solid and form seals with the edges of the regeneration box.

What is claimed is:

1. A system for removing CO2 comprising:
a group of carbon dioxide removal structures, wherein each carbon dioxide removal structure comprises a porous solid substrate supported on the structure, wherein each porous substrate having a sorbent supported within its pores, wherein the sorbent being capable of adsorbing or binding to carbon dioxide;
a first set of stations including the carbon dioxide removal structures, wherein the first set of stations of the carbon dioxide removal structures are configured to remove CO2 from a first gas;
at least one additional station, wherein each additional station includes the carbon dioxide removal structure, wherein each carbon dioxide removal structure corresponding to the at least one additional station is configured to remove $CO_2$ from a second gas;
a sealable regeneration box for regenerating the sorbent, wherein the at least one additional station being positioned after the first set of stations and before the regeneration box; and
a system for moving the carbon dioxide removal structures between each of the stations of the first set of stations, the at least one additional station, and the regeneration box, wherein the system for moving the carbon dioxide removal structures includes a track that is open-ended,
wherein the first gas has a concentration of $CO_2$ that is higher than the concentration $CO_2$ in the second gas.

2. The system of claim 1, wherein the carbon dioxide removal structures form a continuous loop.

3. The system of claim 1, wherein the first gas containing $CO_2$ is ambient air.

4. The system of claim 1, wherein the second gas containing $CO_2$ is flue gas or a mixture of flue gas and ambient air.

5. The system of claim 1, wherein the sorbent comprises an amine sorbent.

6. The system of claim 1, wherein the total number of stations for removing $CO_2$ from either the first gas or the second gas being directly determined by the ratio of the adsorption time (for removing $CO_2$ from the gas) to the regeneration time (for stripping $CO_2$ from the sorbent on the porous substrate), the adsorption time being the time to adsorb, on the sorbent, $CO_2$ from the gas mixtures from a base level to a desired level on the sorbent, and the regeneration time being the time to strip the $CO_2$ from the desired level back to the base level on the sorbent.

7. The system of claim 1, wherein the group of carbon dioxide removal structures contain honeycomb monolith structures coated with an amine sorbent.

8. The system of claim 1, wherein the group of carbon dioxide removal structures include 10 carbon dioxide removal structures.

9. The system of claim 8, wherein the first set of stations includes 8 stations, wherein the at least one additional station includes 1 station.

10. The system of claim 1, wherein the amine sorbent comprises an aminopolymer.

11. A method for removing $CO_2$ comprising:
moving a group of carbon dioxide removal structures from station to station while being exposed to a first gas in a first set of stations and subsequently exposing each carbon dioxide removal structure in turn to a second gas, wherein moving the group of carbon dioxide removal structures includes moving the group of carbon dioxide removal structures on an open-ended track, wherein the second gas has a concentration of $CO_2$ that is higher than the concentration of $CO_2$ in the first gas, wherein each removal structure comprises a porous solid substrate supported on the structure, wherein each porous substrate having a sorbent supported within its pores, wherein the sorbent being capable of adsorbing or binding to carbon dioxide; and
sealably, after exposure to the second gas, placing each of the carbon dioxide removal structures in a successive manner into a regeneration box so that the carbon dioxide removal structure within the regeneration box is not exposed to the first gas or the second gas, wherein carbon dioxide sorbed upon the sorbent of the carbon dioxide removal structure is stripped from the sorbent and captured, and the sorbent regenerated during a regeneration time in the regeneration box.

12. The method of claim 11, wherein in the regeneration box the sorbent is exposed to process heat at a temperature of less than 130° C. during the regeneration time to strip the $CO_2$ from the sorbent.

13. The method of claim 12, further comprising reducing the atmospheric pressure within the regeneration box after the carbon dioxide removal structure is sealed within the regeneration box.

14. The method of claim 11, wherein the carbon dioxide removal structures form a continuous loop.

15. The method of claim 11, wherein the first gas containing $CO_2$ is ambient air, wherein the second gas containing $CO_2$ is flue gas or a mixture of flue gas and ambient air.

16. A method for removing $CO_2$ comprising:
exposing a carbon dioxide removal structure to a first gas containing $CO_2$ for a first exposure time wherein the carbon dioxide removal structure contains a porous solid substrate, wherein a sorbent is supported within at least a portion of the porous of the porous solid substate, wherein during the first exposure time the carbon dioxide removal structure is loaded with $CO_2$ to a first loading of $CO_2$ on the sorbent;
exposing, subsequently, the carbon dioxide removal structure to a second gas containing $CO_2$ for a second exposure time, wherein during the second exposure time the carbon dioxide removal structure is loaded with a second loading of $CO_2$ on the sorbent, wherein the first loading of $CO_2$ is less than the second loading of $CO_2$;
regenerating the carbon dioxide removal structure to remove at least a portion of the adsorbed $CO_2$ on the sorbent; and
continuously removing $CO_2$ from both the first gas and the second gas using a group of carbon dioxide removal structure, wherein the continuously removing includes moving the carbon dioxide removal structure on an open-ended track.

17. The method of claim 16, wherein the first gas containing $CO_2$ is ambient air, wherein the second gas containing $CO_2$ is flue gas or a mixture of flue gas and ambient air.

18. The method of claim 16, wherein the carbon dioxide removal structure includes a group of carbon dioxide removal structures, and the group of carbon dioxide removal structures form a continuous loop.

19. The method of claim 16, wherein the group of carbon dioxide removal structures includes 10 carbon dioxide removal structures.

20. The method of claim 16, wherein the carbon dioxide removal structure contain honeycomb monolith structures coated with an amine sorbent.

* * * * *